(12) United States Patent
Fischer

(10) Patent No.: US 7,170,874 B2
(45) Date of Patent: Jan. 30, 2007

(54) ANTENNA HOPPING SEQUENCE FOR TX DIVERSITY IN WIRELESS TELECOMMUNICATION SYSTEMS

(75) Inventor: Georg Fischer, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 1046 days.

(21) Appl. No.: 10/244,308

(22) Filed: Sep. 16, 2002

(65) Prior Publication Data

US 2003/0072293 A1   Apr. 17, 2003

(30) Foreign Application Priority Data

Oct. 9, 2001   (EP)   ................................. 01308619

(51) Int. Cl.
*H04Q 7/00*   (2006.01)
(52) U.S. Cl. ...................................... 370/334; 375/132
(58) Field of Classification Search ................ 370/334, 370/321, 337, 347, 464, 470, 473, 475; 375/130, 375/135, 132
See application file for complete search history.

(56) References Cited

U.S. PATENT DOCUMENTS 6,298,095 B1 * 10/2001 Kronestedt et al. ......... 375/295
6,366,602 B1 *  4/2002 Raitola ....................... 375/135

FOREIGN PATENT DOCUMENTS

| DK | 196 21 199 A1 | 11/1997 |
| EP | 0 479 744 A1 | 4/1992 |
| WO | WO 95/32558 | 11/1995 |
| WO | WO 97/22187 | 6/1997 |

* cited by examiner

*Primary Examiner*—Brenda Pham

(57) ABSTRACT

The invention proposes for improving the overall spectral efficiency of wireless telecommunication systems, in particular of mobile communication systems, the transmission of at least one multiframe signal having a plurality of sub-frames with predefined logical channels (BCCH, FCCH, SCH) repeatedly embedded in predefined sub-frames, wherein a transmitter diversity is applied using antenna and/or polarization hopping sequences such that during the transmission of respective one multiframe, each logical channel (BCCH, FCCH, SCH) is transmitted at least two times with a different antenna and/or polarization.

9 Claims, 2 Drawing Sheets

Fig. 1

| slot | $C_{iv}$ | $C_v$ | a) A | a) B | a) C | a) D | b) A | b) B | b) C | b) D | c) A | c) B | c) C | c) D | d) A | d) B | e) A | e) B |
|---|---|---|---|---|---|---|---|---|---|---|---|---|---|---|---|---|---|---|
| 0 | FCCH | FCCH | 1 | | | | 1 | | | | 1 | | | | 1 | | 1 | |
| 1 | SCH | SCH | | 1 | | | 1 | | | | 1 | | | | | 1 | 1 | |
| 2 | BCCH | BCCH | | | 1 | | | 1 | | | | 1 | | | 1 | | | 1 |
| 3 | " | " | | | | 1 | | | 1 | | | | 1 | | | 1 | 1 | |
| 4 | " | " | 1 | | | | | | | 1 | | | | 1 | 1 | | | 1 |
| 5 | " | " | | 1 | | | 1 | | | | 1 | | | | | 1 | 1 | |
| 6 | CCCH | CCCH | | | 1 | | | 1 | | | | 1 | | | 1 | | | 1 |
| 7 | " | " | | | | 1 | | | 1 | | | | 1 | | | 1 | 1 | |
| 8 | " | " | 1 | | | | | | | 1 | | | | 1 | 1 | | | 1 |
| 9 | " | " | | 1 | | | 1 | | | | 1 | | | | | 1 | 1 | |
| 10 | FCCH | FCCH | | | 1 | | | 1 | | | | 1 | | | 1 | | | 1 |
| 11 | SCH | SCH | | | | 1 | | | 1 | | | | 1 | | | 1 | | 1 |
| 12 | BCCH | BCCH | 1 | | | | | | | 1 | | | 1 | | 1 | | 1 | |
| 13 | " | " | | 1 | | | | | 1 | | | | | 1 | 1 | | 1 | |
| 14 | " | " | | | 1 | | 1 | | | | 1 | | | | 1 | | 1 | |
| 15 | " | " | | | | 1 | | 1 | | | | 1 | | | | 1 | | 1 |
| 16 | CCCH | CCCH | 1 | | | | | | 1 | | | | 1 | | 1 | | 1 | |
| 17 | " | " | | 1 | | | | | 1 | | | | | 1 | 1 | | 1 | |
| 18 | " | " | | | 1 | | 1 | | | | 1 | | | | 1 | | 1 | |
| 19 | " | " | | | | 1 | | 1 | | | | 1 | | | | 1 | | 1 |
| 20 | FCCH | FCCH | 1 | | | | | | 1 | | | | 1 | | 1 | | 1 | |
| 21 | SCH | SCH | | 1 | | | | | 1 | | | | 1 | | | 1 | | 1 |
| 22 | CCCH | SDCCH0 | | | 1 | | | | | 1 | | | | 1 | 1 | | | 1 |
| 23 | " | " | | | | 1 | 1 | | | | 1 | | | | | 1 | 1 | |
| 24 | " | " | 1 | | | | | 1 | | | | 1 | | | 1 | | 1 | |
| 25 | " | " | | 1 | | | | | 1 | | | | 1 | | | 1 | | 1 |
| 26 | CCCH | SDCCH1 | | | 1 | | | | | 1 | | | | 1 | 1 | | | 1 |
| 27 | " | " | | | | 1 | 1 | | | | 1 | | | | | 1 | 1 | |
| 28 | " | " | 1 | | | | | 1 | | | | 1 | | | 1 | | | 1 |
| 29 | " | " | | 1 | | | | | 1 | | | | 1 | | | 1 | 1 | |
| 30 | FCCH | FCCH | | | 1 | | | | | 1 | | | | 1 | | 1 | 1 | |
| 31 | SCH | SCH | | | | 1 | | | | 1 | | | | 1 | | 1 | 1 | |
| 32 | CCCH | SDCCH2 | 1 | | | | 1 | | | | 1 | | | | 1 | | 1 | |
| 33 | " | " | | 1 | | | | 1 | | | | 1 | | | | 1 | 1 | |
| 34 | " | " | | | 1 | | | | 1 | | | | 1 | | 1 | | 1 | |
| 35 | " | " | | | | 1 | | | | 1 | | | | 1 | | 1 | | 1 |
| 36 | CCCH | SDCCH3 | 1 | | | | 1 | | | | 1 | | | | 1 | | 1 | |
| 37 | " | " | | 1 | | | | 1 | | | | 1 | | | | 1 | 1 | |
| 38 | " | " | | | 1 | | | | 1 | | | | 1 | | 1 | | 1 | |
| 39 | " | " | | | | 1 | | | | 1 | | | | 1 | | 1 | | 1 |
| 40 | FCCH | FCCH | 1 | | | | 1 | | | | 1 | | | | 1 | | 1 | |
| 41 | SCH | SCH | | 1 | | | 1 | | | | | 1 | | | | 1 | 1 | |
| 42 | CCCH | SACCH0 | | | 1 | | | 1 | | | 1 | | | | 1 | | 1 | |
| 43 | " | " | | | | 1 | | | 1 | | | | 1 | | | 1 | 1 | |
| 44 | " | " | 1 | | | | | | | 1 | | | | 1 | 1 | | | 1 |
| 45 | " | " | | 1 | | | 1 | | | | | 1 | | | | 1 | 1 | |
| 46 | CCCH | SACCH1 | | | 1 | | | 1 | | | 1 | | | | 1 | | | 1 |
| 47 | " | " | | | | 1 | | | 1 | | | | 1 | | | 1 | 1 | |
| 48 | " | " | 1 | | | | | | | 1 | | | | 1 | 1 | | | 1 |
| 49 | " | " | | 1 | | | 1 | | | | | 1 | | | | 1 | 1 | |
| 50 | IDLE | IDLE | | | 1 | | | 1 | | | | 1 | | | 1 | | | 1 |
| | | | 13 | 13 | 13 | 12 | 13 | 13 | 13 | 12 | 12 | 13 | 14 | 12 | 25 | 26 | 26 | 25 |

ANTENNA HOPPING SEQUENCE FOR TX DIVERSITY IN WIRELESS TELECOMMUNICATION SYSTEMS

CROSS REFERENCE TO RELATED APPLICATION

This application claims priority of European Application No. 01308619.4 filed on Oct. 9, 2001.

BACKGROUND OF THE INVENTION

1. Field of the Invention

The invention relates to a method and to a device for improving the overall spectral efficiency of wireless telecommunication systems.

2. Description of the Related Art

As known by a person skilled in the art, several techniques have been proposed and partially implemented to enhance the spectral efficiency of systems operating with the GSM-standard (Global Systems for Mobile Communication). Techniques for enhancing the spectral efficiency are especially needed for operators, which suffer from limited capacities in particular due to a limited spectrum licenses, that is often the case for GSM operators, in particular in the USA. It is specific to GSM in contrast to other mobile standards, that there is the need to dedicate a big portion of the operator's spectrum for beacon purposes, which includes for example signalling, paging and synchronisation.

Even if there is only one beacon frequency for respective one base transmitter station (BTS), the spectrum is wide due to a high cluster size of typically 15 ... 18 cells. Considering an operator having a license for 5 MHz, this means that 3 to 3.6 MHz of the operator's spectrum is given away for a single frequency, which accordingly is covering about 60 to 72% of the total spectrum. In contrast thereto, a typical cluster size for traffic frequencies is about ⅓ of the beacon cluster size, i.e. around 5 to 6 cells.

In order to improve the overall total spectral efficiency different techniques are known and may be applied.

One of these known techniques comprises the use of adaptive arrays. However, systems incorporating such adaptive arrays are very complex. They need a lot of DSP (Digital Signal Processor) processing power and a huge effort with the radio frequency processing. Moreover, multi-carrier amplifiers are sometimes needed which are difficult, in particular concerning their designing for GSM because of high linearity requirements. Summarising, the costs are very high and such a system is hard to be managed and to be planned. Additionally the adaptive arrays only enhance the spectral efficiency of the traffic portion of the operator's spectrum but do not improve the spectral efficiency with the portion of the spectrum, which is used for the broadcast control channel (BCCH). Consequently, when using a system incorporating adaptive arrays still a lot of spectrum is wasted for beacon purposes, i.e. for example for the broadcast channel.

A further known technique utilises the compact mode, formally the enhanced data rate through GSM evolution (EDGE) compact. Even if the improvement by running compact mode and also the effort for its implementation is moderate, one of the problems with compact is, that it implies a totally new signalling scheme, which existing mobiles are not able to decode. Accordingly, this is not a preferred solution for established networks or those who want to offer roaming for foreign users.

Still another known technique proposes the use of transmitter diversity, i.e. TX diversity, through delay diversity enhancing the performance only for low dispersion profiles, like with urban scenarios. For rural applications with late echoes however, a high time dispersion and performance degrading is a result. A further disadvantage is that depending on the number of artificial delay paths multiple transceivers are needed causing this solution to be coastwise unattractive.

Still a further known technique consists of the use of TX diversity through antenna hopping using simple cyclic antenna hopping sequences. Antenna hopping or equivalent polarisation hopping or a combination of both does not suffer from the problem of increased hardware effort since it can be realised be means of additional software for the combination of baseband and synthesiser hopping.

Since an antenna hopping scheme also is forming a basis of the invention for the following description and the appended set of claims the term of antenna hopping is generally standing as a synonym for polarisation, too.

The problem with cyclic antenna hopping sequences, however, is that only the signalling channels but not the synchronisation channels for frequency and time synchronisation are improved, since for example the broadcast control channel is combined with other logical channels which partially are not organised in blocks of four bursts like the FCCH (Frequency Correction Channel) and the SCH (Synchronisation Channel). Accordingly, a simple cyclic antenna hopping sequence like ABABABAB with two antennas "A" and "B" or ABCDABCDABCDABCD with four antennas "A", "B", "C" and "D" is neither a good solution.

SUMMARY OF THE INVENTION

Thus an object of the invention is to provide with regard to the known state of the art a new and improved approach for reducing the necessary cluster size needed for logical channels and hence, to significantly increasing the overall spectral efficiency.

The inventive solution is achieved by a method incorporating the features of claim 1 and by a device incorporating the features of claim 10.

Advantageous and/or preferred embodiments or refinements are the subject matter of the respective dependent claims.

Accordingly, the invention proposes to transmit at least one multiframe signal having a plurality of predefined sub-frames with predefined logical channels repeatedly embedded therein by applying a transmitter diversity using antenna and/or polarisation hopping sequences such, that during the transmission of respective one multiframe each logical channel is transmitted at least two times with a different antenna and/or polarisation.

Thus especially with regard to the broadcast control channel which typically is combined with other logical channels, in particular the time and frequency synchronisation channel, at least partially not organised in blocks of four bursts, like the FCCH and the SCH, a good link even for these types of channels which are pre-requisite for any kind of a wireless communication is ensured.

Thus, according to a preferred refinement the inventive approach is apt to transmit a multiframe signal, preferably a so-called 51-multiframe-signal, with at least one of that logical channels embedded therein organised in blocks of a single burst, wherein such a logical channel practically comprises a frequency correction and/or synchronisation data.

Preferably the inventive method utilises a none-cyclic hopping sequence applied.

It has been turned out that by applying the similar antenna or polarisation for the logical channels which are organised in blocks of a single burst it is further ensured that a mobile station is able to easily synchronise to a network if for example the frequency correction channel is detected since the synchronisation channel can be detected via the similar antenna or polarisation, too.

According to the today's standards, it is further suggested to transmit respective two successive sub-frames with the same antenna and/or polarisation, since such time synchronisation channel is embedded directly after the frequency correction channel and hence, are successively read by the mobile station. Practically, a transmitter unit or transceiver device having at least two antennas is provided for the step of transmitting.

Since a mobile station for synchronising to a network generally uses at least three trials to find and decode synchronisation channels, according to a very preferred embodiment a transmitter unit having at least two or more antennas is used. However, the number of antennas should matched the number of trials.

However, by further increasing the number of antennas, over which is hopped the benefits can be further improved. In particular the cell selection is improved as fading of the received (RX) level of which a mobile reports to the base station controller (BSC) or which a mobile uses to make selection of serving cell or measuring neighbour cells is reduced.

Preferably, the transceiver device comprises at least two dual polarised antennas with a 10 lambda spacing or multiple antenna branches of arbitrary location and polarisation. Alternatively or in addition the transceiver devise comprises at least four vertical or horizontal polarised antennas.

For allowing switching between given antennas or polarisation and/or means for performing baseband hopping respective switching means are provided.

Furthermore the described method can be implemented as a software product running within a transceiver device.

Advantageously, the inventive method and the adapted transceiver device are adapted to operate on GSM-based systems.

BRIEF DESCRIPTION OF THE DRAWINGS

Subsequently the invention is exemplary described in more detail, in particular on the bases of a preferred refinement and with reference to the accompanied drawings, in which:

FIG. 1 is schematically depicting different proposals for antenna hopping sequences on the broadcast control channel.

DETAILED DESCRIPTION

Figure 2A:
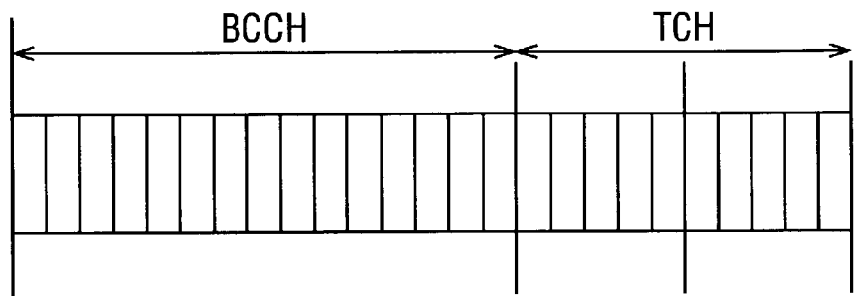
FIG. 2 is showing the spectrum partitioning between the broadcast control channel and the traffic channels based on US-typical 5 MHz spectrum licenses in comparison to four different technologies.

Referring first to FIG. 1 hopping sequences for a multiframe signal are depicted, wherein each multiframe comprises 51-TDMA-subframes for the transmitting of control channels which are not associated with a traffic channel (TCH). As known, the logical channels can be used only in certain combinations, for which the GSM-standard defines different channel configurations that are usually realised and offered from a base transceiver station (BTS).

Thus, in particular if the BCCH-channel is combined with other logical channels which partially are not organised in blocks of four bursts like the FCCH (Frequency Correction Channel) and the SCH (Synchronisation Channel) the invention proposes a special irregular antenna hopping scheme or sequence for ensuring a good link for all types of channels, especially such synchronisation channels like the FCCH for frequency synchronism and the SCH for time synchronism.

Both of these channels, i.e. the FCCH and the SCH are a necessary pre-requisite for any kind of wireless communication, since when a mobile starts to log on a network it first searches the FCCH and than reads the SCH with the next time frame and the succeeding BCCH.

From this point of view the standardised channel combinations IV and V are quite similar for designing a hopping sequence as the FCCH and SCH are located at identical positions. The channel combination IV is incorporating a combination of the BCCH with the synchronisation channels FCCH and SCH for frequency and time as well as with common control channels CCH. The channel combination V is additionally incorporating stand-alone dedicated control channels SDCCH and slow associated control channels. These two standardised channel combinations IV and V, based on 51-multiframe signals respectively having the numbered subframes 0 . . . 50, are schematically depicted in columns $C_{IV}$ and $C_V$ of FIG. 1, respectively. As can be seen therefrom the FCCH is located within the subframes 0, 10, 20, 30, and 40 whereas the SCH is located within the subframes 1, 11, 21, 31 and 41.

A most critical constraint is that these frequency correction and time synchronisation channels only consist of a respective single burst in contrast to the other logical channels incorporated by the standardised combinations, i.e. to the common, dedicated and/or associated control channels CCH, SDCCH or SACCH, which are arranged respectively through blocks of four bursts. Accordingly, the frequency correction channel FCCH and the time synchronisation channels SCH do not profit from redundancy by means of a wide interleaving over a block.

Moreover, for ensuring that also the time synchronisation channel SCH should be received well for the case the FCCH is received well by the mobile station both channels should preferably use the same antenna.

Based on the channel combinations IV and V according to the columns $C_{IV}$ and $C_V$ of FIG. 1, the SCH is transmitted with the respective successive timeslot following the FCCH and hence, the mobile station reads the SCH directly after the FCCH. Hopping sequences covering that object is are shown by FIG. 1, wherein proposals of inventive hopping sequences are depicted in columns b) and c) based on four antennas ABCD and in column e) based on two antennas AB.

Preferred structures of inventive hopping sequences include a non-cyclic hopping scheme and/or a hopping scheme which ensures that respective two different successive logical channels are transmitted by the same antenna.

Such preferred sequences are therefore ensuring that the mobile is able to synchronise the network if it has detected an FCCH. However, generally the used methodology of the mobile stations for the synchronisation to a network comprises that a trial of at least three times is applied to find a block of ten bursts, which starts with a FCCH, SCH and two control channels. Consequently, normally within the three trials of the mobile station during the length of one multiframe, three different antennas should send the synchronisation channels. From that perspective it is sufficient to change the antennas or even the polarisation at least two or three times for the defined positions of the FCCH and SCH within the transmission of one multiframe. Based on the invention, it can be assumed that enough time is passed before the re-use of the respective antennas is performed, as this provides enough channel de-correlation.

However by increasing the number of antennas over which is hopped, the cell selection is further improved as the fading on the receivers level, of which a mobile station reports to the base station controller or makes use for the selection of a serving cell, is reduced.

Regarding FIG. 1 in detail, various inventive proposals for antenna hopping sequences on the BCCH are shown. The columns a), b) and c) refer to hopping sequences of four antennas ABCD, whereas the columns d) and e) refer to hopping sequences of two antennas.

Also there are a plurality of further possible hopping sequences these columns already show the essential differences.

As mentioned above, one of the problems is that the length of the multiframe on a BCCH is 51, a number, which can not be divided by 4, 3 or 2, i.e. the number of antennas, polarisation's and/or combinations. Consequently, a hopping scheme would always differ per multiframe if it runs continuously. Even this would make a sense in some cases it should be ensured that the frequency correction channel, i.e. the FCCH is sent from all antennas and that no antenna is preferred within a multiframe.

Regarding first such a known simple cyclic hopping, as depicted by column a), it is obviously for a person skilled in the art that if such a hopping scheme would run continuously in a multiframe only the two antennas A and C out of the four antennas are used for the FCCH and the other two antennas B and D are used for the SCH.

With the scheme according to columns b) and c) of FIG. 1 all four antennas A, B, C and D are used within a multiframe for a pair of the frequency correction and the time synchronisation channel FCCH or SCH and thus significantly improves the reception quality of the mobile station, since within the shortest time all four antennas are used. For example, according to ETSI standard GSM 05.08 only 0.5 sec time is allowed to get synchronised. From this aspect it is clear, that any technique is beneficial to help speeding up the time to get synchronised.

Furthermore, with both hopping sequences it is ensured that enough time is passed by re-using the respective antennas. As the SCH is always sent by the same antenna as the FCCH according to the sequence „AABCDABCDABBCD-ABCD . . . " of column b), the scheme „AABCDABCD-ABBCDABCD . . . " according to column c) slightly divers from column b) in that the respective SCH and the FCCH are sent not always by the same antenna, such as for example during the timeslots 40 and 41. Moreover a prioritisation of antenna A for the synchronisation channels is avoided according to column c).

For the sequences based on a two antennas A and B hopping case, two proposals identified by columns d) and e) of FIG. 1 are depicted.

The sequence according to column d) reflects the known simple cyclic hopping which in turn has the disadvantage that within a multiframe only one antenna is used for the FCCH and the other for the SCH. Thus, if a mobile station would be in a fading hole with respect to antenna B for example, it would be able to synchronise in frequency but not in time. For the next multiframe it would appear the other way around.

With the sequence „AABABABABABBA . . . " according to column e) of FIG. 1 both antennas A and B are used in an alternating manner within a multiframe for the respective succeeding frequency correction channel and the time synchronisation channel. Since both antennas A and B are used for both channels, wherein each antenna is respectively used for a pair of the FCCH or SCH, the reception quality of the mobile station is significantly improved. Thus, if a mobile station would be in a fading hole with respect to antenna B for example, it would still be able to synchronise in frequency and in time.

The last row of FIG. 1 includes a counter concerning the times an antenna is used per multiframe. This should be nearly equally distributed in order to ensure that the improvement of cell selection is present, as mentioned above.

In the past, a very strong constraint against reducing the cluster size for the BCCH-support channel significantly, i.e. to reduce the reuse distance to cells using the same frequency, was the loss of synchronism of the mobile station with the network. According to practical experiences in the US, where sometimes an aggressive cluster size of twelve cells is used with a 5 MHz spectrum, it is reported that often BSIC (Base Station Identity Code) decoding problems are the cause for dropped calls and unsuccessful handovers.

Accordingly, the invention takes care to allow the mobile station to synchronise even when not moving and staying in a fading hole, which is the worst case, since the SCH also contains the BSIC (Base Station Identity Code) which consists of the NCC (Network Colour Code) and BCC (Base Station Colour Code). Thus, the invention is ensuring that the mobile is able to decode this BSIC as it first assists in the decision whether the base station is belonging to the correct network and second what the name of the base station to be reported to the base station controller for handover decisions is.

Consequently the use of the invention enables a network planner to assign fewer frequencies for the BCCH reuse pattern and hence to reserve an additional spectrum for traffic channels TCH. Due to the result of additional spectrum for traffic, additional radios can be plugged into a base transceiver station (BTS) for a given spectrum that can obtain additional capacity.

Figure 2B:
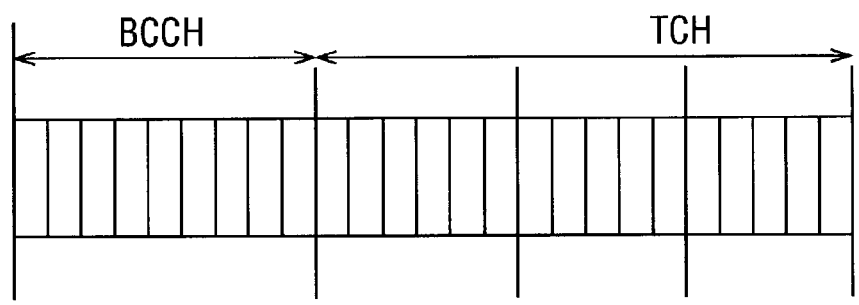
Figure 2C:
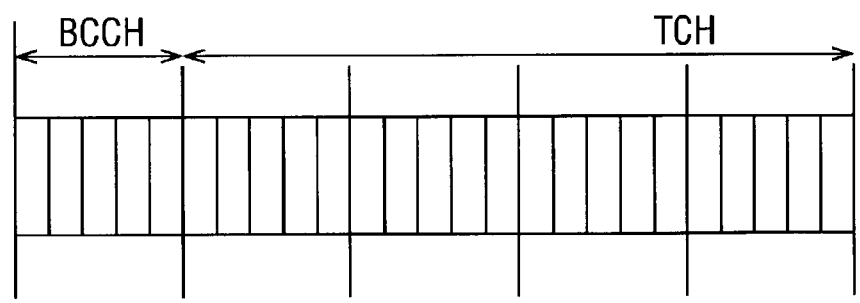
Figure 2D:
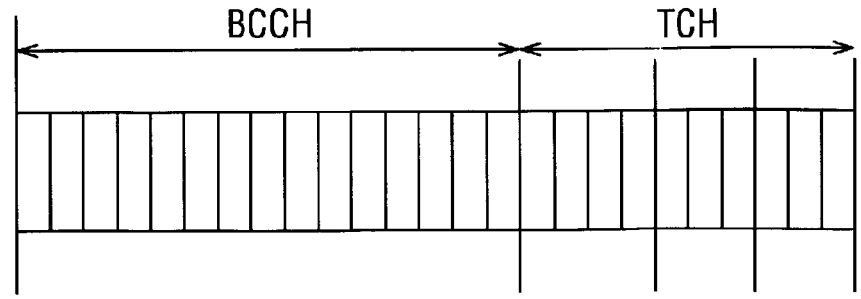

FIG. 2 schematically illustrates this spectral efficiency gain based on a 5 MHz operator spectrum, which can be regarded as the typical case, in particular for the US.

According to FIG. 2 four examples a), b) c) and d) of a spectrum partitioning between the BCCH and traffic channels are depicted, wherein each of the examples based on a total spectrum of 5 MHz.

Regarding example a) representing the current standard, three carriers are supported, with a BCCH carrier covering a cluster of 15 cell and two traffic channels, each of which adapted for a cluster size of 5. Consequently the spectrum reserved for the BCCH is 3 MHz and for each of the traffic channels 1 MHz.

According to the example b) representing a transceiver diversity with two antennas the cluster size for the BCCH has to be 9, so that the spectrum partitioned for the BCCH includes 1.8 MHz. With regard to the traffic channels, three carriers can be provided, one of which is covering a cluster size of 6 and two of which covering a cluster size of 5 cell, and hence, having respective spectrums of 1.2 MHz or 1 MHz.

According to the example c) representing a transceiver diversity based on four antennas five carriers can be supported, one of which for the BCCH and the others for the traffic. Furthermore, the cluster size of the BCCH merely comprises 5 and hence is representing a spectrum of 1 MHz, whereas each of the cluster sizes for the traffic channels is 5, with each TCH-carrier having 1 MHz.

Finally with respect to adaptive antennas according to the example d) of FIG. 2 the cluster size of the BCH has to be 15, i.e. 3 MHz and the cluster sizes for the three traffic channels are 4, 3 and 3 covering a respective spectrum of 0.8 MHz, 0.6 MHz and 0.6 MHz.

The following table shows a detailed calculation of spectral efficiency, wherein a four antenna hopping based on the optimised antenna hopping sequences is estimated to allow for a cluster size of five with the BCCH as discussed with respect to FIG. 2.

|  | standard | 2-TX-diversity | 4-TX-diversity | adaptive arry |
|---|---|---|---|---|
| Configuration | 15-5-5 | 9-6-5-5 | 5-5-5-5-5 | 15-4-3-3 |
| no. of carriers | 3 | 3 + 1 = 4 | 3 + 2 = 5 | 3 + 1 = 4 |
| average clustersize | 8.33 | 6.25 | 5 | 6.25 |
| total spectrum | 5 MHz | 5 MHz | 5 MHz | 5 MHz |
| BCCH spectrum | 3 MHz | 1.8 MHz | 1 MHz | 3 MHz |
| traffic spectrum | 2 MHz | 3.2 MHz | 4 MHz | 2 MHz |
| no. Of fullrate channels | 22 | 30 | 38 | 30 |
| rel. gain in no. Of fullrate channels | — | +36% | +72% | +36% |
| carried traffic (2% blocking) | 14.6 Erl. | 21 Erl. | 28.58 Erl. | 21.5 Erl. |
| Capacity gain | — | +47% | 95.8% | +47% |
| capacity gain compared to TX-diversity. | — | — | | −24.8% |
| Spectral efficiency [Erl/sector/MHz] | 2.92 | 4.3 | 5.72 | 4.3 |

Based on this estimation a spectral efficiency gain of around 96% in contrast to 47% with an adaptive array can be obtained. As another result it can be seen that a two antenna hopping delivers around the same performance than an adaptive array.

Consequently the invention is improving the frequency and time synchronisation channels and by that the BSIC decoding. Since this is a pre-requisite for smaller cluster size on BCCH the overall spectral efficiency is improved resulting in a high increase.

For the implementation it should be mentioned that the inventive antenna hopping sequences can be implemented by use of a simple switching device adapted to switch between the antennas or polarisation. This however may result in additional power losses and a transceiver unit having such a switching device usually has a more disturbing temperamental nature. However, it has to be mentioned, that switching of high power RF signals is difficult due to linearity and power dissipation issues. Thus, it is preferred to exchange the respective transceiver units according to the desired hopping sequence, i.e. to respectively exchange in appropriate manner the transceiver for the BCCH and the transceiver for the TCH, each of these units respectively connected to a separate antenna. Consequently, the inventive antenna or polarisation hopping sequences are preferably implemented through a combination of a baseband and synthesiser hopping, in particular by means of an appropriate implementation software.

For example, a typical BTS is able to support three sectors with four antenna branches each from the perspective of available antenna connectors. Thus, a new unit comprising two TX-bandpasses would be needed. The effort and costs caused thereby can be considered low.

Furthermore, regarding the antenna configurations it is not necessary for the implementation of an inventive hopping sequence based on for antennas to set up for individual vertical polarised and widely spaced antennas to enable such hopping scheme. Alternatively two dual polarised antennas with 10 lambda spacing can be chosen for example with regard to the 1900 PCS and other GSM bands.

If however an other polarisation than vertical is forbidden, as for example by FCC in the cellular 850 MHz band, the only possible set-up for this band is to chose four individual vertically polarised antennas, each spaced 10 lambda.

Even the invention is described based on a GSM standard, it should be obvious for a person skilled in the art, that the invention further is covering embodiment slightly modified to comply with other wireless telecommunications standards, such as UMTS, GPRS or EDGE (enhanced data rate through GSM evolution).

I claim:

1. A method for transmission having improved overall spectral efficiency in a wireless telecommunication system, comprising—transmitting at least one multiframe signal having a plurality of sub-frames, wherein:
   three or more predefined logical channels including a frequency correction channel FCCH and a synchronization channel SCH are repeatedly embedded in predefined sub-frames;
   the step of transmitting comprises—applying transmitting diversity using at least one of antenna hopping sequences and polarisation hopping sequences, such that during the transmission of at least one said multiframe signal, each logical channel is transmitted at least twice on different antennas and/or with different polarisations;
   if antenna hopping sequences are used, at least one antenna hopping sequence is applied such that each time an antenna is selected for FCCH the same antenna is selected for SCH; and
   if polarisation hopping sequences are used, at least one polarisation hopping sequence is applied such that each time a polarisation is selected for FCCH the same polarisation is selected for SCH.

2. Method of claim 1, wherein at least one of said logical channels (FCCH, SCH) is organised in blocks of a single burst.

3. Method of claim 1, wherein a definable number of logical channels (BCCH, FCCH, SCH) repeatedly embedded in predefined sub-frames comprises frequency correction and/or synchronisation data.

4. Method of claim 1, wherein a non-cyclic hopping sequence is applied.

5. Method of claim 1, wherein respective two successive sub-frames are transmitted with the same antenna and/or polarisation.

6. Method of claim 1, wherein at least two antennas and/or polarisation are provided for the step of transmitting.

7. Method of claim 1, wherein the hopping sequence is performed through a combination of baseband and synthesiser hopping.

8. Method of claim 1, wherein a least one 51-multiframe signal is transmitted.

9. Transceiver devices adapted to transmit at least one multiframe signal having a plurality of sub-frames with three or more predefined logical channels including a frequency correction channel FCCH and a synchronization channel SCH repeatedly embedded in predefined subframes, wherein the step of transmitting is performed by applying transmitting diversity using at least one of antenna hopping sequences and polarisation hopping sequences, such that during the transmission of at least one said multiframe signal, each logical channel is transmitted at least twice on different antennas and/or with different polarisations;

if antenna hopping sequences are used, at least one antenna hopping sequence is applied such that each time an antenna is selected for FCCH the same antenna is selected for SCH; and if polarisation hopping sequences are used, at least one polarisation hopping sequence is applied such that each time a polarisation is selected for FCCH the same polarisation is selected for SCH.

* * * * *